United States Patent [19]

Stingl

[11] 4,377,519
[45] Mar. 22, 1983

[54] NAVY BLUE WATER-SOLUBLE SULFOPHENYL- OR SULFONAPHTHYL-AZO-1,4-PHENYLENE-AZO-5-(8-ANILINONAPHTHALENE-1-SULFONIC ACID) DYES FOR POLYAMIDES

[75] Inventor: Hans A. Stingl, Toms River, N.J.

[73] Assignee: Toms River Chemical Corporation, Toms River, N.J.

[21] Appl. No.: 186,040

[22] Filed: Sep. 11, 1980

Related U.S. Application Data

[63] Continuation of Ser. No. 943,427, Sep. 18, 1978, abandoned, which is a continuation of Ser. No. 768,516, Feb. 14, 1977, abandoned.

[51] Int. Cl.³ .................. C09B 31/057; D06P 1/39; D06P 3/24
[52] U.S. Cl. .................. 260/190; 260/191; 260/196; 260/200; 260/205; 260/206; 260/208
[58] Field of Search .................. 260/190, 191

[56] References Cited

U.S. PATENT DOCUMENTS

| | | | |
|---|---|---|---|
| 354,746 | 12/1886 | Schad | 260/191 |
| 2,257,694 | 9/1941 | Kreaser | 260/190 X |
| 3,814,749 | 6/1974 | Feeman | 260/190 |
| 3,947,435 | 3/1976 | Pechmeze et al. | 260/190 |

FOREIGN PATENT DOCUMENTS 1425883 2/1976 United Kingdom .............. 260/190

*Primary Examiner*—Floyd D. Higel
*Attorney, Agent, or Firm*—Edward McC. Roberts; Joseph G. Kolodny

[57] ABSTRACT

Water-soluble dyes of the structure

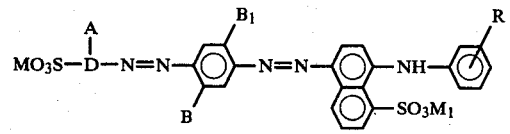

wherein
D is a benzene group or a naphthylene group,
A is H, Cl, Br, lower alkyl, or lower alkoxy
B is H, lower alkyl, or lower alkoxy,
$B_1$ is lower alkyl or lower alkoxy,
R is H, Cl, Br, lower alkyl, or lower alkoxy, and
M and $M_1$ are H, Na, K, $NH_4$, or Li.

The dyes have good affinity for natural and synthetic polyamide fibers, including wool, silk and nylon, which they dye from neutral or weakly acid dye baths in strong navy blue shades with good fastness properties. These dyes are also valuable in combination with certain orange dyes to produce black shades on polyamide fibers that possess good fastness properties.

7 Claims, No Drawings

NAVY BLUE WATER-SOLUBLE SULFOPHENYL- OR SULFONAPHTHYL-AZO-1,4-PHENYLENE-AZO-5-(8-ANILINONAPHTHALENE-1-SULFONIC ACID) DYES FOR POLYAMIDES

This is a continuation of application Ser. No. 943,427 filed on Sept. 18, 1978, now abandoned, which is a continuation of Ser. No. 768,516, filed Feb. 14, 1977, now abandoned.

This invention is directed to water-soluble disazo dyes which have good affinity for natural and synthetic polyamide fibers, including wool, silk and nylon, to a process of dyeing polyamide fibers, and to polyamide fibers dyed with the dyestuffs of this invention.

The dyes of this invention are of the structure

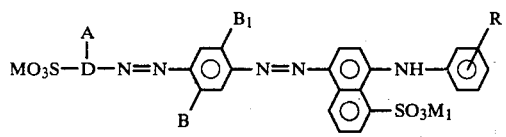

wherein
D is a phenylene group or naphthylene group,
A is H, Cl, Br, lower alkyl, or lower alkoxy,
B is H, lower alkyl, or lower alkoxy,
$B_1$ is lower alkyl or lower alkoxy,
R is H, Cl, Br, lower alkyl, or lower alkoxy, and
M and $M_1$ are H, Na, K, $NH_4$, or Li.

Dyestuffs of the above formula can be used in neutral or weakly acidic aqueous dyebaths to dye polyamide fibers in strong navy blue shades. The polyamide material dyed with the dyes of this invention have good fastness properties, being particularly light-fast and fast to dry cleaning, washing and perspiration.

Of the dyes of the above structure, having lower alkyl or lower alkoxy groups, those are preferred where the carbon content of the alkyl or alkoxy group is one to four carbon atoms, particularly one or two carbon atoms.

Further to the preferred dyes of the above structure, particularly useful dyes are those where A is H, Cl, methyl, methoxy or ethoxy, B is H, methyl, or methoxy, $B_1$ is methoxy and R is H or p-methyl.

Preferred dyes of this invention are exemplified by the following structures

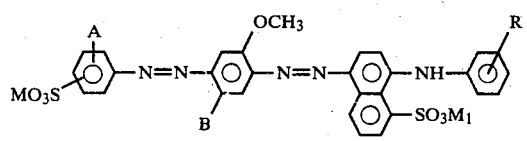

wherein
$SO_3M$ is meta or para to the azo linkage;
A is H, Cl, methyl, methoxy or ethoxy
B is H, methyl or methoxy, and
R is H, Cl, methyl, methoxy, ethyl and ethoxy, particularly where R is H or p-methyl; and

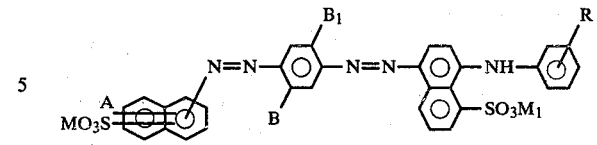

wherein
A is H, Cl, methyl, methoxy or ethoxy,
B is H, methyl, methoxy or ethoxy,
$B_1$ is methyl, methoxy, or ethoxy, and
R is H, Cl, methyl, methoxy, ethyl or ethoxy, particularly where R is H or p-methyl.

Of the preferred naphthalene dyes, those of the following structure are more preferred

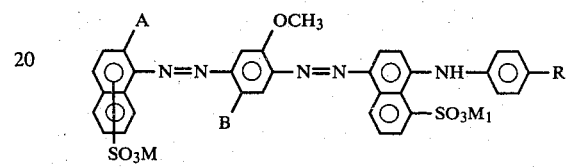

wherein
A is H, methoxy, or ethoxy,
B is H, methyl or methoxy,
R is H or methyl, and
$SO_3M$ is in the 4-, 5-, 6-, or 7-position of the naphthalene group (or mixtures thereof).

The dyes of this invention are readily dissolved in water to give neutral to weakly acidic dyebaths which are useful for dyeing natural and synthetic polyamide fibers, especially nylon fibers.

The instant dyes are also valuable in combination with certain orange dyes to produce black shades on polyamide fibers. In addition to the navy dyes of this invention and orange dyes in combination, a small amount of a red or rubine dye can be usefully added in producing black shades. Among the suitable orange dyes, useful for this purpose, may be mentioned C.I. Acid Orange 116 and the orange dyes of Table II of German Offenlegungsschrift No. 2006261, Aug. 19, 1971.

Among the suitable red dyes, useful for this purpose, may be mentioned C.I. Acid Red 299 and the red dyes of Table III of German Offenlegungsschrift No. 2006261, Aug. 19, 1971.

The above-described blue/orange and blue/orange/red dye combinations are water soluble and dye polyamides, particularly nylon, in black shades which are fast to light, dry cleaning, washing and perspiration.

In addition to the good water solubility, good affinity for polyamide materials, and excellent fastness properties, the dyes of this invention have the further advantage of being readily prepared without the use of beta-naphthylamine, a known carcinogen which was formerly widely used in dyestuff synthesis.

The following Examples illustrate the invention in greater detail, but do not limit the invention.

EXAMPLE 1

(A) 20.8 parts by weight of 3-amino-4-chlorobenzenesulfonic acid are dissolved in 100 parts of water and 4 parts of caustic soda. Ice, 20 parts of concentrated hydrochloric acid, and a solution of 7 parts of sodium nitrite in 20 parts of water are added to achieve diazotization at 3°–7° C.

(B) 15.3 parts of 2,5-dimethoxyaniline, dissolved at 45° C. in 120 parts of water and 10 parts of concentrated hydrochloric acid, are combined with the diazoticed 3-amino-4-chlorobenzenesulfonic acid and enough ice to keep the temperature below 7° C., and the pH is raised to 2 with 20% soda ash solution. The coupling product 2,5-dimethoxy-4-(2'-chloro-5'-sulfobenzenazo) aniline is separated by filtration, washed with very dilute hydrochloric acid, and dried.

(C) This dried monoazo compound is charged into 110 part of 12% nitrosyl sulfuric acid (in anhydrous sulfuric acid), held at 30°–35° C. overnight, and then poured slowly on 250 parts of ice and 20 parts of salt. The rediazotized compound is separated by filtration, reslurried in 800 parts of ice water, combined with a partial solution of 27 parts of Phenyl Peri Acid in 250 parts of water at pH 6 and stirred for 3 hours at 5° C. while adding soda of ash solution to maintain the pH. 10 Parts by weight of salt per 100 parts of reaction volume are added, the temperature is raised to 80° C., and the dyestuff is isolated by filtration at pH 7 and washed clean with 10% by wt. hot salt solution. The compound has the structure

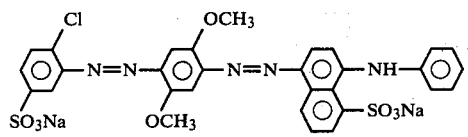

and dyes nylon from neutral or weakly acid dyebaths in level blue shades of good fastness properties.

EXAMPLE 2

When an equivalent amount of Tolyl Peri acid is used in place of the Phenyl Peri acid of Example 1, a compound is obtained with the structure

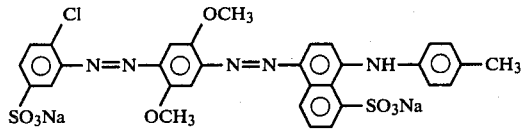

which has similar properties.

EXAMPLE 3

(A+B) 20.8 Parts of 3-amino-6-chlorobenzenesulfonic acid are treated as described in Example 1, A+B, except for the final drying.

(C) The monoazo cake is dissolved in 750 parts of water with sufficient sodium hydroxide solution to establish pH 9. 135 Parts of salt and 4 parts of sodium nitrite are added, followed during one half hour at 15° C. by 18 parts of 50% sulfuric acid. The suspension is stirred overnight at room temperature and more sodium nitrite, as conc. aq. solution, is added as needed to maintain an excess. The rediazotized compound is separated by filtration, reslurried in 800 parts of ice water and combined with 27 parts of Phenyl Peri acid as described before. One obtains a blue dye of the structure

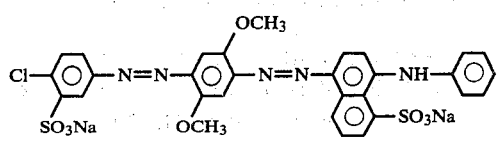

EXAMPLE 4

When dimethoxyaniline in Example 3 (part B) is replaced by an equivalent amount of methyl cresidine, a blue dye of the following structure is obtained

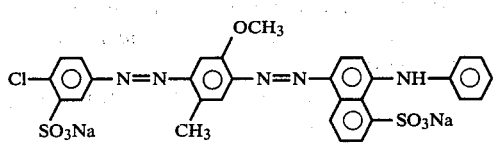

EXAMPLE 5

(A) 17.3 Parts of metanilic acid are dissolved in 70 parts of water and 8 parts of 50% by weight caustic soda solution. Ice, 22 parts of con. hydrochloric acid, and a solution of 7 parts of sodium nitrite in 20 parts of water are added with sufficient ice to maintain the temperature at 0°–3° C. to diazotize the metanilic acid.

(B) 15.3 Parts of 2,5-dimethoxyaniline, dissolved at 45° C. in 120 parts of water and 11 parts of conc. hydrochloric acid are combined with the diazotized metanilic acid, using sufficient ice to keep the temperature below 5° C. and the pH is raised to 2.5 with 20% soda ash solution. After completion of the coupling, the product is dissolved at pH 9 with 50% soda solution and then salted with 50 parts of sodium chloride. Rediazotization is accomplished by addition of 7.5 parts of sodium nitrite, followed by an aqueous solution of 21 parts of naphthalenesulfonic acid and sufficient sulfuric acid to establish a congo acid reaction. A temperature of 32° C. is maintained for 2 hours.

(C) This reaction mass is cooled and added during one half hour to a partial solution of 27 parts of Phenyl Peri acid in 250 parts of water and 11 parts of soda ash at 5° C. A pH of 5 is maintained for two hours, then raised to 7, and salt is added. The disazo compound is isolated by filtration. It has the structure

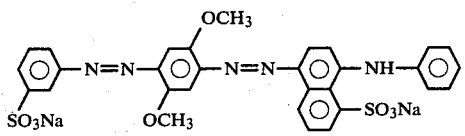

and dyes nylon from neutral or weakly acid dyebaths in level and fast shades of blue.

EXAMPLE 6

When dimethoxyaniline in Example 5 (part B) is replaced by an equivalent amount of methyl cresidine, a blue dye of the following structure is obtained:

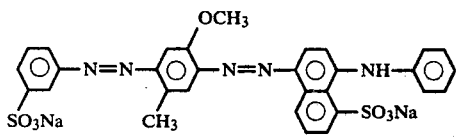

EXAMPLE 7

(A) 17.3 Parts of sulfanilic acid are diazotized in 50 parts of ice-water and 11 parts of concentrated hydrochloric acid by the rapid addition of a concentrated solution of 7 parts of sodium nitrite in water at about 4° C.

(B) The resulting diazotized sulfanilic acid is combined at a temperature below 5° C. with 13.7 parts of 2-methoxy-5-methylaniline previously dissolved in 120 parts of water at 45° C. and 11 parts of concentrated hydrochloric acid. Sufficient 20% soda ash solution is added to raise the pH to 3.0 and the mixture is stirred for a period of 5 hours.

The coupling product is then acidified to pH 1.5 and isolated by filtration. The filter cake is reslurried in 250 parts of water. 14 Parts of naphthalenesulfonic acid and 5 parts of sulfuric acid are added while the temperature is raised to 30° C. Now 7 parts of sodium nitrite, as concentrated aqueous solution, is added gradually to achieve diazotization within 3 hours.

(C) The reaction mass is coupled to Phenyl Peri acid and isolated as described in Example 5C. It has the structure

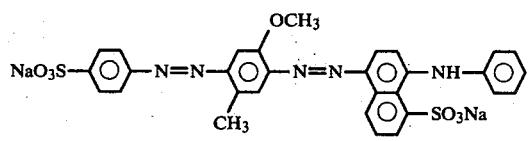

and dyes nylon in blue shades with good fastness properties.

EXAMPLE 8-25

By varying the appropriate starting materials, corresponding compounds of the following structures are obtained (given in acid form).

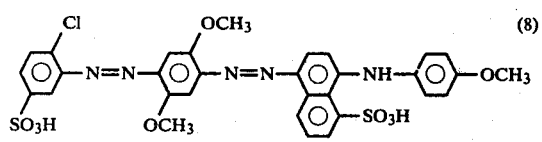

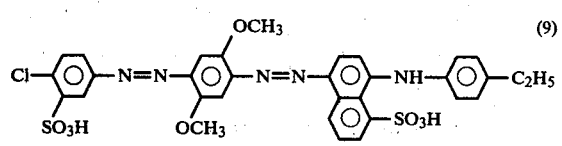

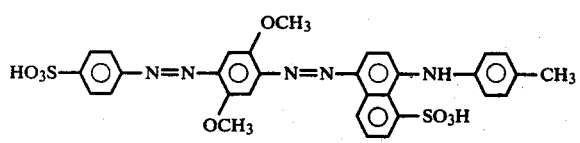

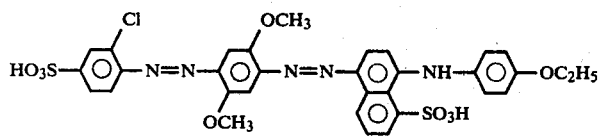

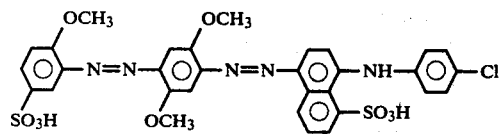

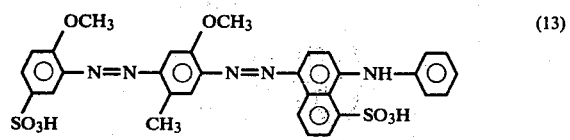

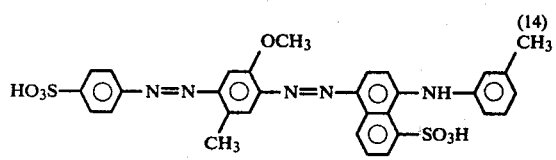

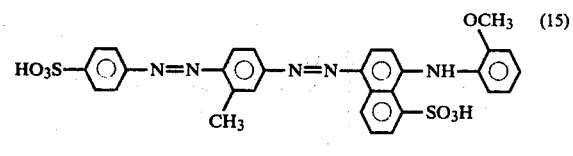

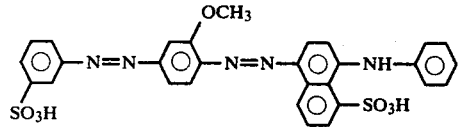

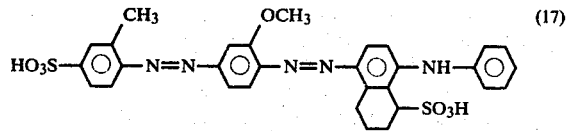

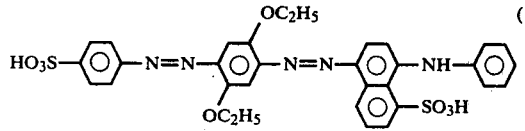

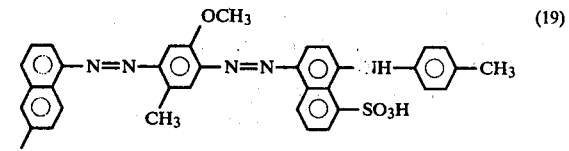

-continued

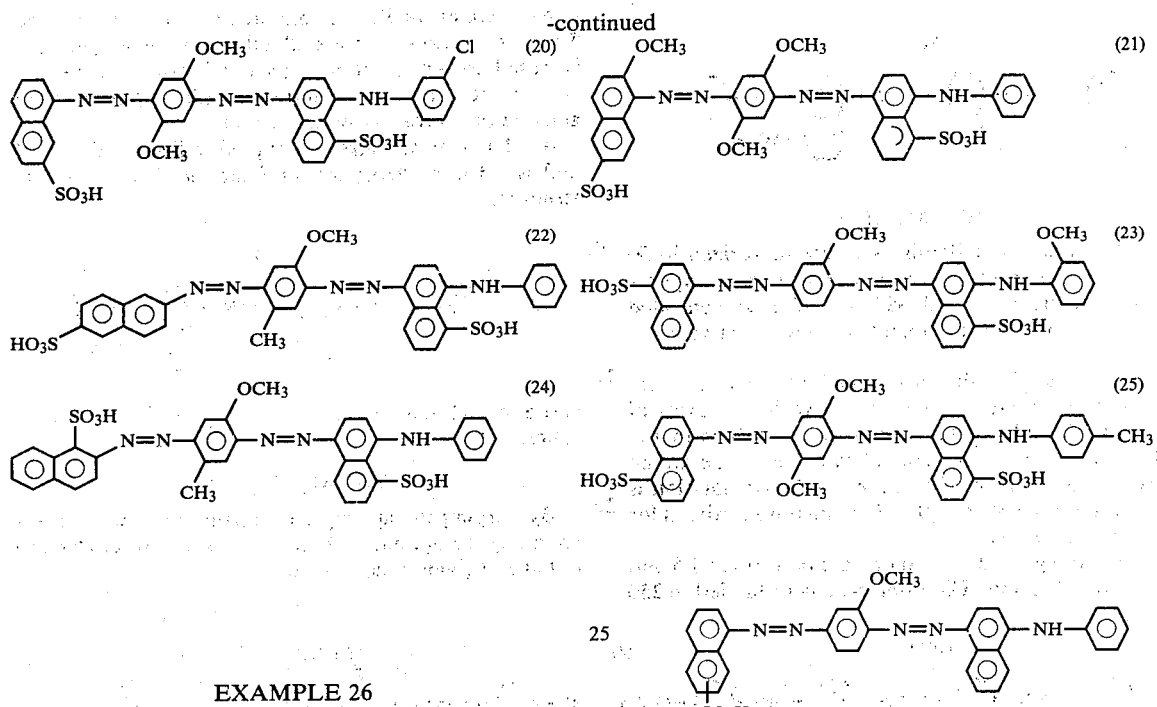

EXAMPLE 26

(A) 22.3 Parts by weight of Mixed Cleves acid (a roughly 1:1 mixture of 1-naphthylamine-6 and 7-sulfonic acids) are dissolved in 200 parts of hot water and 4 parts of caustic soda. Ice, 24 parts of conc. hydrochloric acid and a solution of 7 parts of sodium nitrite in 20 parts of water are added to achieve diazotization at 0°–4° C.

(B) 22.6 Parts of sodium O-anisidine-N-methane sulfonate, as a wet cake containing about 40% solids, is combined with the diazotized Mixed Cleves acid, sodium acetate and enough ice to hold the temperature near 5° C. and the pH at 3.5 to 4.5 for at least two hours. The resulting suspension of the coupling product is heated and neutralized with caustic soda. Additional caustic soda is added to a concentration of 3.6 parts per volume and the mixture is boiled for 90 minutes to remove the methane-sulfonic acid group. The reaction mass is cooled, the pH is lowered to 8 by gradual addition of conc. hydrochloric acid and enough salt is added to precipitate most of the monoazo compound, which is then isolated by filtration and washed with some 15% salt solution.

(C) Enough filter cake to represent 17.85 parts of the 4'-amino-3'-methoxybenzeneazo-1-naphthalene-6 and 7-sulfonic acids is dissolved in 250 parts of water and rediazoticed at room temperature by the addition of 3.5 parts of sodium nitrite followed by an aqueous solution of 10.5 parts of naphthalenesulfonic acid and sufficient sulfuric acid to establish a congo acid reaction, then stirred for two hours.

(D) This reaction mass is cooled and added during 20 minutes to a partial solution of 15.2 parts of Phenyl Peri acid in 50 parts of water and enough ice to hold a temperature of 0°–5° C. while the pH is maintained near 7 with soda ash solution. The resulting dyestuff solution is salted 15% weight by volume while heating and the precipitate is collected by filtration at 40° C., washed with some 10% salt solution and dried. It dyes nylon in reddish blue shades.

The resulting dye is of the structure

EXAMPLE 27

When the product from part A above (instead of diazotized sulfanilic acid) is combined with 2-methoxy-5-methaniline as described in Example 7 B), first paragraph, the resulting monoazo cake is isolated by filtration, dissolved in 500 parts of water at pH 10, rediazotized at room temperature by adding 7 parts of sodium nitrite, 21 parts of naphthalenesulfonic acid and sufficient sulfuric acid to establish a congo red reaction, and coupled to 27 parts of Phenyl Peri acid in 100 part of water at 5°–10° C. and pH 5–7, the dyestuff subsequently isolated by filtration at room temperature corresponds to the structure

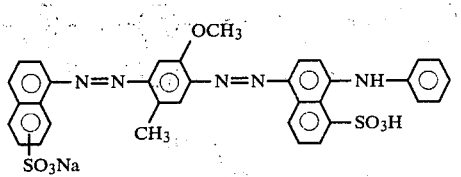

and dyes nylon from neutral dye baths in strong, even and light fast shades of blue.

When the above-described preparations are carried out with potassium salts and potassium hydroxide in place of sodium salts and sodium hyxroxide, the potassium salts of the corresponding dyestuffs are obtained. In an analogous fashion, lithium or ammonium salts and hydroxides produce the lithium or ammonium salts of the dyestuffs.

EXAMPLE 28

Into an aqueous dyebath containing 4000 parts by weight of water, 1 part of the dyestuff described in Example 1, 1 part of nonionic wetting agent, 6 parts of monosodium phosphate and 0.75 parts of disodium phosphate, to maintain a pH of 6.0, 100 parts of nylon fabric are entered at 60° C. The temperature is raised to 100° C. and held at 100° C. for 1 hour while the fabric is mildly agitated to assure uniform dyeing.

The fabric is then removed from the bath, rinsed with cold water, and dried. It is dyed an even and fast shade of blue.

EXAMPLE 29

Into an aqueous dyebath containing 3000 parts of water, 1 to 2.5 parts of the dyestuffs described in Examples 2, 5, 7, 13, 16 and 17, respectively, 1 part of nonionic wetting agent, 10 parts of anhydrous sodium sulfate and 10 parts of acetic acid, 100 parts of nylon fabric are entered at 60° C. The temperature is raised to 96° C. in 45 minutes and held at 96° C. for one hour while the fabric is mildly agitated. The fabric is then removed from the bath, rinsed with cold water and dried. It is dyed even and fast shades of deep blue.

What is claimed:

1. A dye of the structure

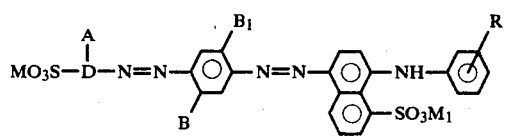

wherein
D is a phenylene or a naphthalene group,
A is H, Cl, Br, lower alkyl, or lower alkoxy,
B is H, lower alkyl, or lower alkoxy,
$B_1$ is lower alkyl or lower alkoxy,
R is H, Cl, Br, lower alkyl, or lower alkoxy, and
M and $M_1$ are H, Na, K, $NH_4$, or Li.

2. The dye of claim 1, wherein
A is H, Cl, Br, methyl, ethyl, methoxy or ethoxy,
B is H, methyl, ethyl, methoxy or ethoxy,
$B_1$ is methyl, ethyl, methoxy or ethoxy, and
R is H, Cl, Br, methyl, ethyl, methoxy or ethoxy.

3. The dye of claim 2, of the structure

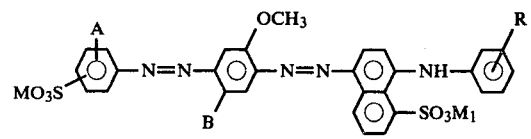

wherein
$SO_3M$ is meta or para to the azo linkage;
A is H, Cl, methyl, methoxy or ethoxy
B is H, methyl or methoxy, and
R is H, Cl, methyl, methoxy, ethyl or ethoxy.

4. The dye of claim 3, wherein R is H or p-methyl.

5. The dye of claim 2 of the structure

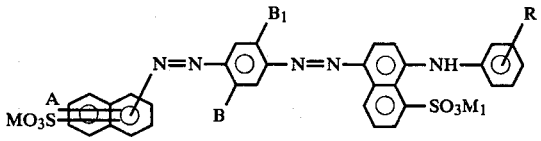

wherein
A is H, Cl, methyl, methoxy or ethoxy,
B is H, methyl, methoxy or ethoxy,
$B_1$ is methyl, methoxy, or ethoxy, and
R is H, Cl, methyl, methoxy, ethyl or ethoxy.

6. The dye of claim 5, wherein R is H or p-methyl.

7. The dye of claim 6, of the structure

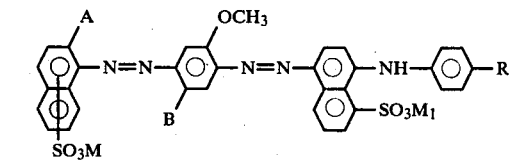

wherein
A is H, methoxy, or ethoxy,
B is H, methyl or methoxy,
R is H or methyl, and
$SO_3M$ is in the 4-, 5-, 6-, or 7-position of the naphthalene group (or mixtures thereof).

* * * * *